(12) United States Patent
Pinkos et al.

(10) Patent No.: US 7,909,339 B2
(45) Date of Patent: Mar. 22, 2011

(54) APPARATUS FOR COUPLING A DISCONNECTABLE STABILIZER BAR

(75) Inventors: Andrew F. Pinkos, Clarkston, MI (US); Todd M. York, Howell, MI (US); Curt D. Gilmore, Fenton, MI (US); Gary A. Oliveira, Lake Orion, MI (US); Mark A. Danielsen, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/887,142

(22) Filed: Sep. 21, 2010

(65) Prior Publication Data

US 2011/0006493 A1    Jan. 13, 2011

Related U.S. Application Data

(63) Continuation of application No. 11/926,658, filed on Oct. 29, 2007, now Pat. No. 7,832,739.

(60) Provisional application No. 60/857,149, filed on Nov. 6, 2006.

(51) Int. Cl.
*B60G 17/015* (2006.01)
(52) U.S. Cl. .................. 280/5.511; 192/69.9; 192/84.92; 267/188; 267/277; 280/5.506; 280/124.106; 280/124.107; 280/124.152
(58) Field of Classification Search ............... 192/69.9, 192/84.92; 280/124.106, 124.107, 124.1, 280/124.149, 124.152, 5.511, 5.506; 307/10.1, 307/44, 65, 66
See application file for complete search history.

(56) References Cited

U.S. PATENT DOCUMENTS

| | | | |
|---|---|---|---|
| 4,206,935 | A | 6/1980 | Sheppard et al. |
| 4,648,620 | A | 3/1987 | Nuss |
| 4,796,911 | A | 1/1989 | Kuroki et al. |
| 5,217,245 | A | 6/1993 | Guy |
| 5,251,926 | A | 10/1993 | Aulerich et al. |
| 5,527,061 | A | 6/1996 | Karl |
| 5,580,079 | A | 12/1996 | Pradel et al. |
| 5,601,165 | A | 2/1997 | Oppitz et al. |
| 5,700,027 | A | 12/1997 | Schiffler |
| 5,788,008 | A | 8/1998 | Fort et al. |
| 5,826,687 | A | 10/1998 | Bungeler et al. |
| 6,022,030 | A | 2/2000 | Fehring |
| 6,361,033 | B1 | 3/2002 | Jones et al. |
| 6,425,585 | B1 | 7/2002 | Schuelke et al. |
| 6,428,019 | B1 | 8/2002 | Kincad et al. |

(Continued)

FOREIGN PATENT DOCUMENTS

JP        3-227713 A      10/1991

(Continued)

*Primary Examiner* — Ruth Ilan
*Assistant Examiner* — James English
(74) *Attorney, Agent, or Firm* — Harness, Dickey & Pierce, P.L.C.

(57) ABSTRACT

A vehicle stabilizer bar assembly having a pair of stabilizer bar members that are selectively uncoupled via a clutch. The clutch includes a moving element that can be selectively moved via an actuator to effect the uncoupling of the stabilizer bar members. The actuator is configured to apply a force to the moving element concentrically about the axis along which the moving element translates. The clutch is configured to transmit torque from one of the stabilizer bar members to the other stabilizer bar member concentrically about the axis. A method for operating a vehicle stabilizer bar assembly is also provided.

20 Claims, 7 Drawing Sheets

U.S. PATENT DOCUMENTS

| | | | |
|---|---|---|---|
| 6,481,732 B1 | 11/2002 | Hawkins et al. | |
| 6,513,819 B1 | 2/2003 | Oliver et al. | |
| 6,530,586 B2 | 3/2003 | Fader et al. | |
| 6,550,788 B2 | 4/2003 | Schmidt et al. | |
| 6,637,757 B2 | 10/2003 | Ignatius et al. | |
| 6,651,991 B2 | 11/2003 | Carlstedt et al. | |
| 6,805,361 B2 | 10/2004 | Germano et al. | |
| 6,811,166 B2 | 11/2004 | Carlstedt et al. | |
| 6,874,792 B2 | 4/2005 | Vortmeyer et al. | |
| 6,948,707 B2 | 9/2005 | Gradu | |
| 6,951,341 B1 | 10/2005 | Beetz et al. | |
| 6,958,030 B2 | 10/2005 | DeGowske | |
| 7,100,926 B2 | 9/2006 | Osterlanger et al. | |
| 7,121,559 B2 | 10/2006 | Ersoy et al. | |
| 7,134,672 B2 | 11/2006 | Beishline et al. | |
| 7,150,458 B2 | 12/2006 | Reichel et al. | |
| 7,156,406 B2 | 1/2007 | Kraus et al. | |
| 7,204,494 B2 | 4/2007 | Reichel et al. | |
| 7,207,574 B2 | 4/2007 | Gradu et al. | |
| 7,287,759 B2 | 10/2007 | Uchiyama et al. | |
| 7,290,772 B2 | 11/2007 | Taneda et al. | |
| 7,309,074 B2 | 12/2007 | Taneda | |
| 7,344,142 B2 | 3/2008 | Yasui | |
| 7,717,437 B2 * | 5/2010 | Adams et al. | 280/5.508 |
| 7,832,739 B2 * | 11/2010 | Pinkos et al. | 280/5.511 |
| 2002/0125675 A1 | 9/2002 | Clements et al. | |
| 2003/0137090 A1 | 7/2003 | Reichel et al. | |
| 2004/0217568 A1 | 11/2004 | Gradu | |
| 2004/0217569 A1 | 11/2004 | Gradu et al. | |
| 2005/0023789 A1 | 2/2005 | Suzuki et al. | |
| 2005/0179221 A1 | 8/2005 | Yasui et al. | |
| 2005/0206100 A1 | 9/2005 | Ohta et al. | |
| 2005/0212224 A1 | 9/2005 | Osterlanger et al. | |
| 2005/0236793 A1 | 10/2005 | Taneda et al. | |
| 2006/0151964 A1 | 7/2006 | Kasamatsu | |
| 2008/0106055 A1 | 5/2008 | Pinkos et al. | |
| 2009/0085310 A1 * | 4/2009 | Dziemballa et al. | 280/5.511 |

FOREIGN PATENT DOCUMENTS

| | | |
|---|---|---|
| JP | 3-227714 A | 10/1991 |

\* cited by examiner

APPARATUS FOR COUPLING A DISCONNECTABLE STABILIZER BAR

RELATED APPLICATIONS

This application is a continuation of U.S. Ser. No. 11/926,658 filed Oct. 29, 2007 (now U.S. Pat. No. 7,832,739), which claims the benefit of U.S. Provisional Patent Application No. 60/857,149 filed Nov. 6, 2006. The disclosures of these applications are incorporated by reference as if fully set forth in detail herein.

INTRODUCTION

The present invention generally relates to vehicle suspension systems and more particularly to an anti-roll suspension system having a pair of independently mounted stabilizer bar halves that can be selectively de-coupled from one another.

Traditional vehicle suspension systems include resilient devices, such as coil springs and leaf springs, to flexibly support a portion of a vehicle. These devices enable all of the vehicle wheels to maintain contract with the ground when traversing uneven terrain. Segregating the vehicle into unsprung and sprung portions in this manner is also useful for preventing severe impulsive forces from being transmitted to the vehicle occupants.

It is known that when vehicle travels around a corner, centrifugal forces acting on the vehicle tend to cause the sprung portion of the vehicle to roll. In severe instances, the effects of roll can cause instability and impede the ability of the driver to control the vehicle. Although the effects of roll are more pronounced with vehicles having a comparatively high center of gravity, such as vans or trucks, every vehicle is affected by roll.

In tuning the ride and handling of a vehicle, it is often desirable to soften or lower the spring rate of the suspension's springs to provide a softer, less harsh ride. One of the main drawbacks associated with this approach is that a suspension system having springs with a relatively low spring rate permits the vehicle body to roll at a relatively higher rate. Accordingly, it would seem that the combination of springs with a very low spring rate and a relatively stiff stabilizer bar would optimize both the ride and handling of the vehicle.

The relatively stiff stabilizer bar, however, tends to directly connect the vehicle wheels such that the motion of one wheel is copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. This "crosstalk" between the vehicle wheels can be undesirable.

Another drawback of stabilizer bars is that their torsional stiffness inhibits the free travel of the vehicle wheels. Modern materials and design techniques have substantially reduced the weight of the vehicle wheels and mounting structures to such an extent that the weight of a wheel and its mounting structure is typically insufficient to cause the stabilizer bar to rotate. While this problem is rarely, if ever, noticed on the relatively flat surfaces of modern roads, it can become apparent when the vehicle is operated over un-even terrain. In some situations, it is possible for one of the vehicle wheels to remain in an elevated position over a dip in the terrain due to the torsional resistance of the stabilizer bar. While situations of this severity are not routinely encountered, the fact remains that the stabilizer bar can reduce vehicle traction in some situations.

Various solutions that address the aforementioned drawbacks are disclosed in U.S. Pat. No. 6,428,019 entitled "Semi-Active Anti-Roll System" and U.S. Pat. No. 6,637,757 entitled "Apparatus And Method For Coupling A Disconnectable Stabilizer Bar System", the disclosures of which are hereby incorporated by reference as if fully set forth in detail herein. Stabilizer bar products incorporating one or more innovations disclosed in the '019 and/or the '757 patents are commercially manufactured and marketed by American Axle & Manufacturing under the SmartBar™ product line. While such configurations are suitable for their intended purpose, they are nonetheless susceptible to improvement.

SUMMARY

In one form, the present teachings provide a stabilizer bar system that includes a clutch and first and second arms. The clutch has a housing assembly, a plurality of coupling members and an actuator. The housing assembly defines a bore with a longitudinal axis. The coupling members are arranged concentrically about the longitudinal axis. The actuator includes a plunger that is slidably disposed along the longitudinal axis between a retracted position and an extended position. The actuator is selectively operable for moving the plunger to the extended position to apply a force that moves at least one of the coupling members along the longitudinal axis from a first position to a second position. The first arm is coupled to a second one of the coupling members and the second arm is non-rotatably coupled to the housing assembly. Placement of the first one of the coupling members in the first position non-rotatably couples the first one of the coupling members to the second one of the coupling members to inhibit relative rotation between the first and second arms. The first one of the coupling members is disengaged from the second one of the coupling members to permit relative rotation between the first and second arms when the first one of the coupling members is positioned in the second position.

In another form, the present teachings provide a method that includes: providing a stabilizer bar system having a first arm member, a second arm member and a clutch assembly, the clutch assembly including a plurality of concentrically disposed coupling members and an actuator; and activating the actuator to cause the actuator to apply a force to a first one of the coupling members, the force being applied concentrically about the first one of the coupling members, the first one of the coupling members responsively translating and disengaging a second one of the coupling members to permit the first arm member to rotate relative to the second arm member.

In yet another form, the present teachings provide a stabilizer bar system that includes a clutch and first and second generally L-shaped stabilizer bar portions. The clutch has a housing assembly, a first transmission member, a second transmission member, and an actuator. The housing assembly defines a bore having a longitudinal axis. The first and second transmission members are received in the bore. The second transmission member is non-rotatably coupled to the housing assembly and slidable within the bore between a first position and a second position. The second transmission member is non-rotatably coupled to the first transmission member when the second transmission member is in the first position. The first transmission member is rotatable relative to the second transmission member when the second transmission member is in the second position. The actuator includes a coil and a plunger that is movable along the longitudinal axis between a returned position and an extended position. The plunger is coupled to the second transmission member. The first generally L-shaped stabilizer bar portion is non-rotatably coupled to the first transmission member and the second generally L-shaped stabilizer bar portion is non-rotatably coupled to the housing assembly. Actuation of the actuator moves the plunger into the extended position to cause a force to be applied concentrically to the second transmission member that pushes the second transmission member toward the second position.

In still another form, the present teachings provide a stabilizer bar system that includes first and second stabilizer bar members and a clutch with a housing, a first coupling member, a second coupling member and an actuator. The housing defines a bore into which the first stabilizer bar member is received. The second stabilizer bar member is non-rotatably coupled to the housing. The first coupling member is received in the bore and is rotatable about an axis. The first coupling member is non-rotatably coupled to the first stabilizer bar member. The second coupling member is an annular structure that is axially movable along the rotational axis of the first coupling member between a first position, in which the second coupling member non-rotatably couples the first coupling member to the housing, and a second position that permits rotation of the first coupling member relative to the housing. The actuator is configured to move the second coupling member between the first and second positions. The actuator includes a plunger that is axially movable along the rotational axis. The second coupling member is disposed concentrically about the plunger and the plunger extending at least partially through the second coupling member.

In yet another form, the present teachings provide a stabilizer bar system that includes first and second stabilizer bar members and a clutch with a housing, a first coupling member, a second coupling member, and an actuator. The housing defines a bore into which the first stabilizer bar member is received. The second stabilizer bar member is non-rotatably coupled to the housing. The first coupling member is received in the bore and is rotatable about an axis. The first coupling member is non-rotatably coupled to the first stabilizer bar member. The second coupling member is an annular structure that is axially movable along the rotational axis of the first coupling member between a first position, in which the second coupling member non-rotatably couples the first coupling member to the housing, and a second position that permits rotation of the first coupling member relative to the housing. The actuator is configured to move the second coupling member between the first and second positions and includes a plunger, an annular coil, a first spring and a second spring. The plunger is axially movable along the rotational axis. The coil is disposed concentrically about the plunger. The first spring biases the second coupling member toward the first position. The second spring permits relative axial movement of the plunger relative to the second coupling member such that the plunger can be moved by a magnetic field created by the coil when the first and second coupling members are torque-locked.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
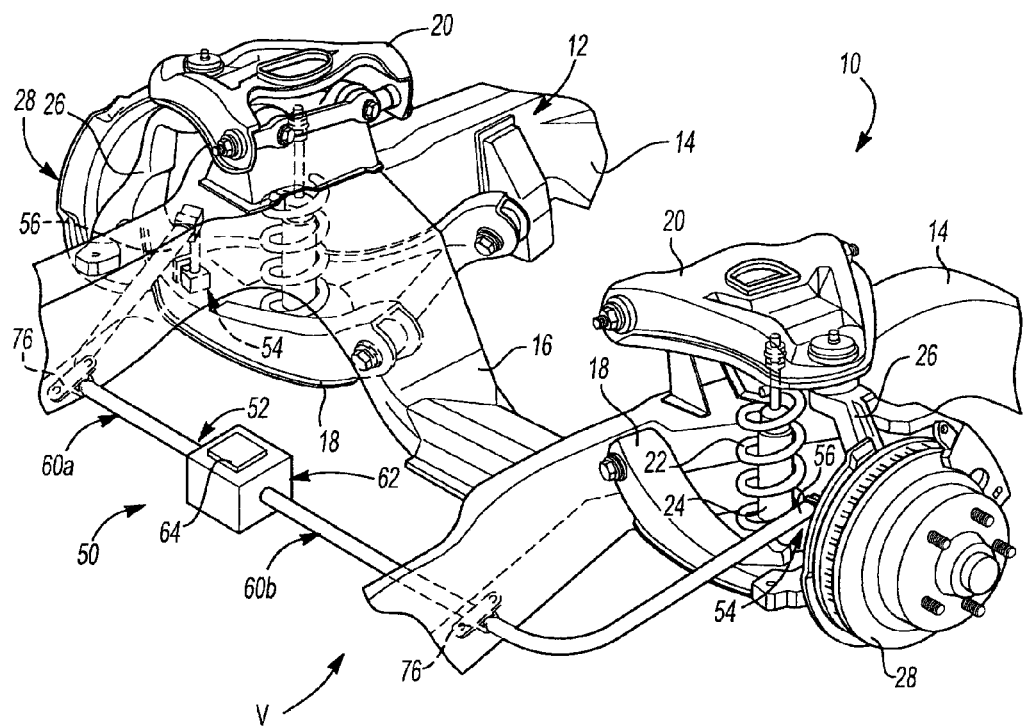
FIG. 1 is a perspective view of a portion of a vehicle having an independent suspension with an anti-roll system constructed in accordance with the teachings of the present disclosure.

With reference to FIG. 1 of the drawings, an exemplary vehicle is shown and can include an independent front suspension system 10. The independent front wheel suspension can be of a type having suspension components at each wheel that are suspended from the vehicle frame structure 12. In the particular example provided, the frame structure 12 can include a pair of longitudinal side rails 14 and a crossbeam 16, but those of ordinary skill in the art will appreciate that the term "frame structure" need not refer to a frame as such, but could also refer to one or more regions of the vehicle body that act as an integrated frame structure. Those of ordinary skill in the art will appreciate that although a front suspension system is illustrated and described herein, the teachings of the present disclosure are also applicable to a rear suspension system.

At each wheel, the suspension system 10 can include a lower control arm 18 and an upper control arm 20. The lower and upper control arms 18 and 20 can be pivotally attached to the frame structure 12. A strut assembly, which can have a helical coil spring 22 and a strut damper 24, can be retained between an intermediate portion of the lower control arm 18 and the frame structure 12 to support the weight of the vehicle body (not shown) and any loads that are transmitted through the lower control arm 18. The upper control arm 20 can be connected to the lower control arm 18 by a steering knuckle 26. A hub and rotor assembly 28 can be rotatably attached to a spindle portion (not specifically shown) of the steering knuckle 26 such that a wheel and tire (not shown) may be mounted thereon. The suspension system 10 can further include an anti-roll system 50 that can include a stabilizer bar assembly 52 and a pair of end links 54 that can connect the ends 56 of the stabilizer bar assembly 52 to the lower control arms 18. The stabilizer bar assembly 52 can include first and second stabilizer bar members 60a and 60b, respectively, a clutch assembly 62 and a controller assembly 64.

Figure 2:
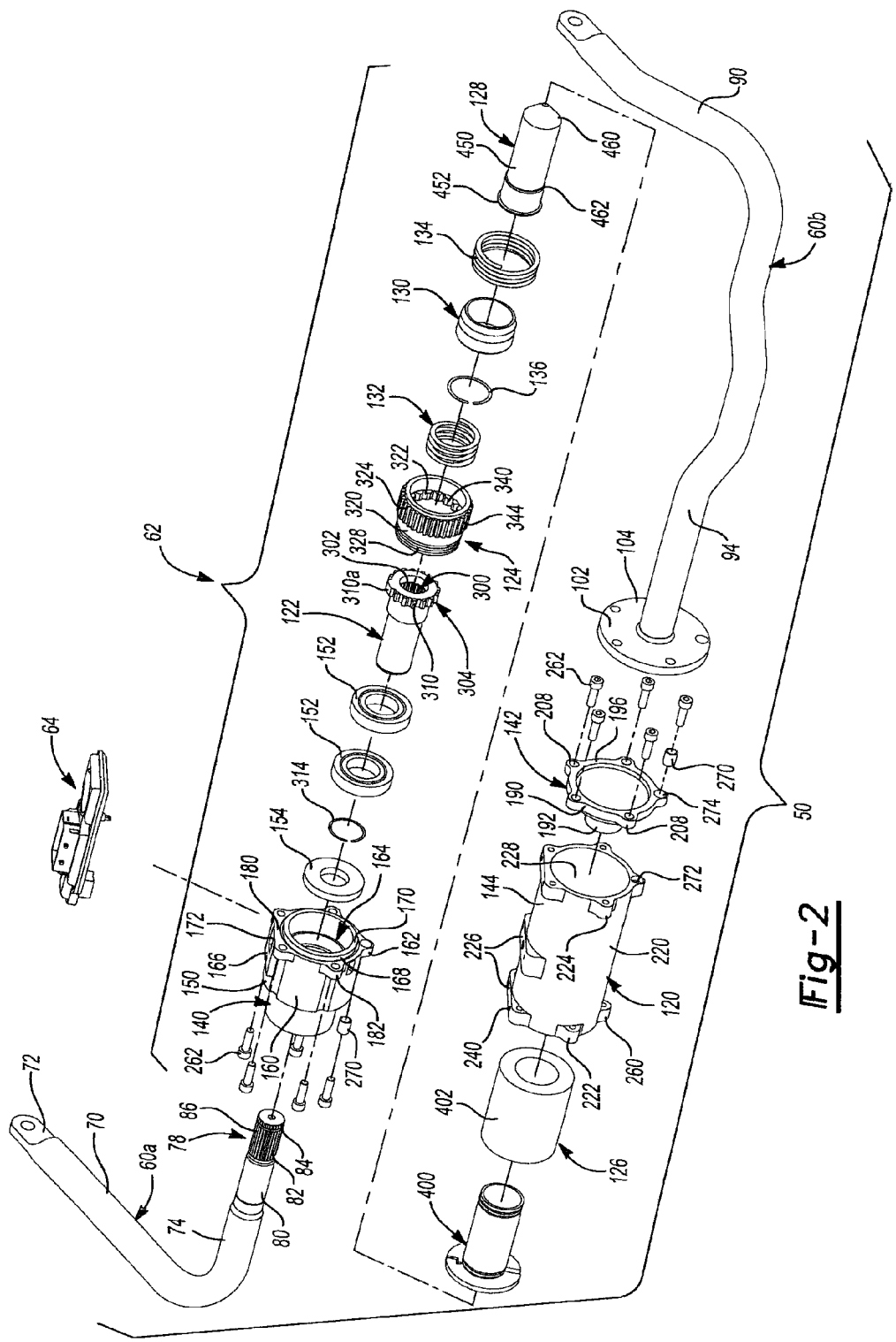
FIG. 2 is an exploded perspective view of the anti-roll system of FIG. 1.

With additional reference to FIG. 2, the first stabilizer bar member 60a can be generally L-shaped, having an arm portion 70, which can have a mounting portion 72, and a leg portion 74 that can be coupled to an end of the arm portion 70 opposite the mounting portion 72. The mounting portion 72 can be configured to be coupled to the frame structure 12 in a conventional manner, such as the end link 54. The leg portion 74 can be rotatably coupled to the frame structure 12 in a conventional manner (such as a bracket 76) and can include a coupling portion 78 that can couple the first stabilizer bar member 60a to the clutch assembly 62. In the example provided, the coupling portion 78 includes a journal 80, a coupling member 82 and a snap-ring groove 84 that is disposed on a side of the coupling member 82 opposite the journal 80. The coupling member 82 can have a non-circular shape and in the example provided, includes a plurality of longitudinally-extending teeth or splines 86.

The second stabilizer bar member 60b can also be generally L-shaped and have an arm portion 90 and a leg portion 94. The arm portion 90 can be similar to the arm portion 70 of the first stabilizer bar member 60a. The leg portion 94 can be coupled to an end of the arm portion 90 and can include a coupling member 102 that can be employed to non-rotatably couple the second stabilizer bar member 60b to the clutch assembly 62. In the particular example provided, the coupling member 102 includes a flange 104 that can be fixedly coupled to the clutch assembly 62, as will be discussed in detail below, but those of ordinary skill in the art will appreciate that the coupling member 102 could be formed in any desired manner that permits the second stabilizer bar member 60b to be non-rotatably coupled to the clutch assembly 62.

Figure 3:
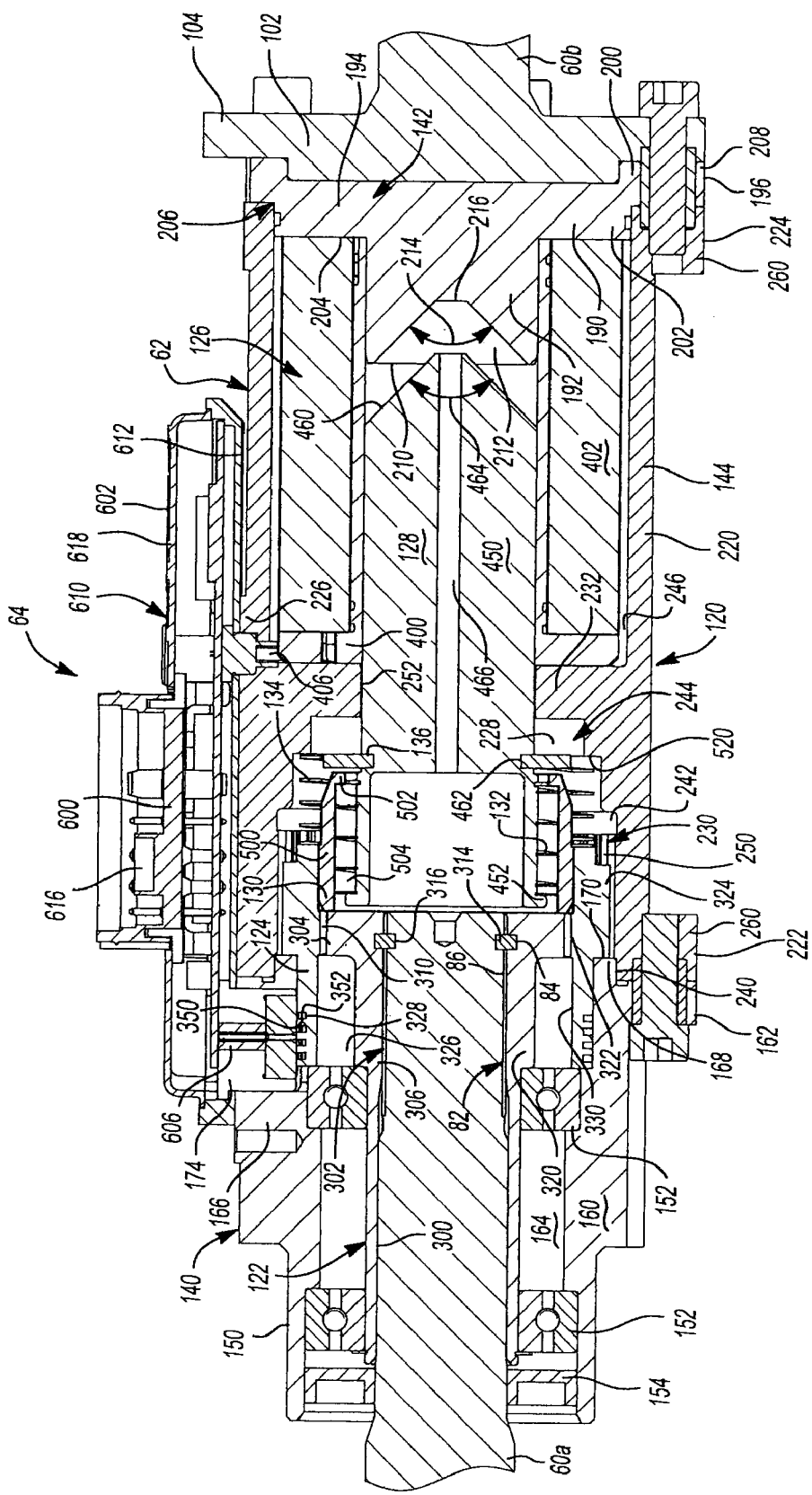
FIG. 3 is a section view taken longitudinally through a portion of the anti-roll system of FIG. 1 illustrating the second transmission member in the engaged condition.

With reference to FIGS. 2 and 3, the clutch assembly 62 can include a housing assembly 120, a first transmission member 122, a second transmission member 124, a coil assembly 126, a plunger 128, a sleeve 130, a first spring 132, a second spring 134 and a retaining ring 136. The housing assembly 120 can include a first end cap 140, a second end cap 142 and a housing 144. The first end cap 140 can include a cap member 150, a pair of bearings 152 and a seal 154. The cap member 150 can be formed of any appropriate material and can include a body 160 and a flange 162. The body 160 can define a central bore 164, which can be oriented along a longitudinal axis of the cap member 150, a sensor boss 166, a pilot portion 168 and an end face 170. The sensor boss 166 can have a flat outer surface 172 and can define a sensor aperture 174 that can extend through a side of the body 160. The sensor aperture 174 can be disposed generally perpendicular to both the flat outer surface 172 and the central bore 164. The pilot portion 168 can be an annular structure that can be generally concentric with the central bore 164. The pilot portion 168 can cooperate with another portion of the cap member 150, such as the flange 162, to define a shoulder 180. The end face 170 can be an axial end face of a portion of the cap member 150, such as the pilot portion 168, and can be spaced axially apart from the shoulder 180. The flange 162 can be disposed about the body 160 and can include a plurality of bosses 182.

The second end cap 142 can include a cap member 190 and a plunger backstop 192. In the particular example provided, the cap member 190 and the plunger backstop 192 are unitarily formed of an appropriate material, such as a magnetic ferrous-alloyed powdered metal, but it will be appreciated that they could be formed as discrete components that are coupled to one another to facilitate the manufacture of the second end cap 142 and/or the use of different materials for the cap member 190 and the plunger backstop 192. The cap member 190 can include a body 194 and a flange 196. The body 194 can define a coupling portion 200, a pilot portion 202 and an end face 204. The coupling portion 200 can be configured to engage the coupling member 102 of the second stabilizer bar member 60b such that the second stabilizer bar member 60b and the cap member 190 are non-rotatably coupled to one another. The pilot portion 202 can be a generally cylindrical structure and can cooperate with another portion of the cap member 190, such as the flange 196, to define a shoulder 206. The end face 204 can be an axial end face of a portion of the cap member 190, such as the pilot portion 202, and can be spaced axially apart from the shoulder 206. The flange 196 can be disposed about the body 194 and can include a plurality of bosses 208. The plunger backstop 192 can be a generally cylindrical structure that can be generally concentric with the pilot portion 202 and can project from the end face 204. The distal end 210 of the plunger backstop 192 can include a plunger aperture 212 that can be disposed about a longitudinal axis of the plunger backstop 192. In the particular example provided, the plunger aperture 212 has a frusto-conical shape having a cone angle 214 of about 60° to about 120° and a flat end wall 216.

The housing 144 can include a body 220 and first and second end flanges 222 and 224, respectively. The body 220 can be a hollow generally cylindrical structure and can include a plurality of mounting pads 226, a bore 228, a first coupling member 230 and an interior wall 232. The mounting pads 226 can be formed on an exterior surface of the body 220 and can each include one or more threaded apertures 240. The bore 228 can be disposed longitudinally through the body 220 and can define a pilot bore 240, a first portion 242, a second portion 244 and a third portion 246 that can be concentric with one another. The pilot bore 240 can be sized and configured to receive the pilot portion 168 of the cap member 150 to align the central bore 164 concentrically with the bore 228. The first portion 242 can be sized to receive the second spring 134, the second portion 244 can be sized to receive the sleeve 130 and the third portion 246 can be sized to receive the coil assembly 126 and the pilot portion 202 of the cap member 190. The first coupling member 230 can include a plurality of circumferentially spaced-apart teeth or splines 250 that can be located axially between the pilot bore 240 and the first portion 242. The interior wall 232 can be disposed between the second and third portions 244 and 246 of the bore 228. An aperture 252 can be formed through the interior wall 232.

The first and second end flanges 222 and 224 can be disposed about the body 220 and can each including a plurality of bosses 260. The bosses 182 and 208 of the flanges 162 and 196, respectively, can be aligned to the bosses 260 of the first and second end flanges 222 and 224, respectively, and threaded fasteners 262, such as cap screws, can be employed to fixedly but removably couple the first and second end caps 140 and 142 to the housing 144 such that the body 220 abuts the shoulders 180 and 206 of the cap members 150 and 190, respectively. In the example provided, a sleeve dowel 270 is fitted to a counter bore 272 that is formed in one of the bosses 260 in each of the first and second end flanges 222 and 224 as well as and an associated counter bore or through hole that is formed in the bosses 182 and 208 in the flanges 162 and 196. The sleeve dowels 270 can radially locate the first and second end caps 140 and 142 to the housing 144 such that the flat outer surface 172 of the sensor boss 166 is aligned in a predetermined manner to the mounting pads 226. In the particular example provided, the threaded fasteners 262 are also employed to fixedly but removably secure the flange 104 of the second stabilizer bar member 60b to the second end cap 142.

The first transmission member 122 can be a hollow sleeve having an internal bore 300, a second coupling member 302 and a third coupling member 304. The first transmission member 122 can be rotatable but axially fixed to the first end cap 140. In the example provided, the first transmission member 122 is supported by the bearings 152 in the first end cap 140. The second coupling member 302 can engage the coupling member 82 of the first stabilizer bar member 60a to inhibit relative rotation therebetween. In the particular example provided, the second coupling member 302 can include a plurality of circumferentially spaced-apart longitudinally-extending teeth or splines 306, which are formed about the interior diameter of the internal bore 300, that can matingly engage the splines 86 of the coupling member 82 of the first stabilizer bar member 60a. The third coupling member 304 can have a non-circular shape and in the example provided, includes a plurality of longitudinally-extending teeth or splines 310. One of the splines 310 (e.g., spline 310a) can be sized differently than the remaining splines 310. The first stabilizer bar member 60a can be coupled to first transmission member 122 to inhibit relative axial movement therebetween. In the example provided, a snap ring 314 is received in the snap ring groove 84 and engages another groove 316 that is formed on the first transmission member 122.

The second transmission member 124 can include a body 320, a fourth coupling member 322 and a fifth coupling member 324. The body 320 can include a bore 326 and one or more sensor targets 328. The bore 326 can include a pilot portion 330. The fourth coupling member 322 can be configured to selectively engage the third coupling member 304 of the first transmission member 122 to inhibit relative rotation therebetween. In the particular example provided, the fourth coupling member 322 can include a plurality of circumferentially spaced-apart longitudinally-extending teeth or splines 340, which are formed about the interior diameter of the bore 326, that can matingly engage the splines 310 of the third coupling member 304. While not specifically shown, it will be appreciated that the spacing between two of the splines 340 can be configured to receive the spline 310a to thereby key the third coupling member 304 to the fourth coupling member 322 (i.e., the splines 310 can mesh with the splines 340 in only one rotational position). The fifth coupling member 324 can have a non-circular shape and in the example provided, includes a plurality of longitudinally-extending teeth or splines 344. In the example provided, the sensor target 328 is an annular rim or projection that is disposed about the body 320 and which has first and second wall members 350 and 352, respectively, that are generally perpendicular to the bore 326.

Figure 4:
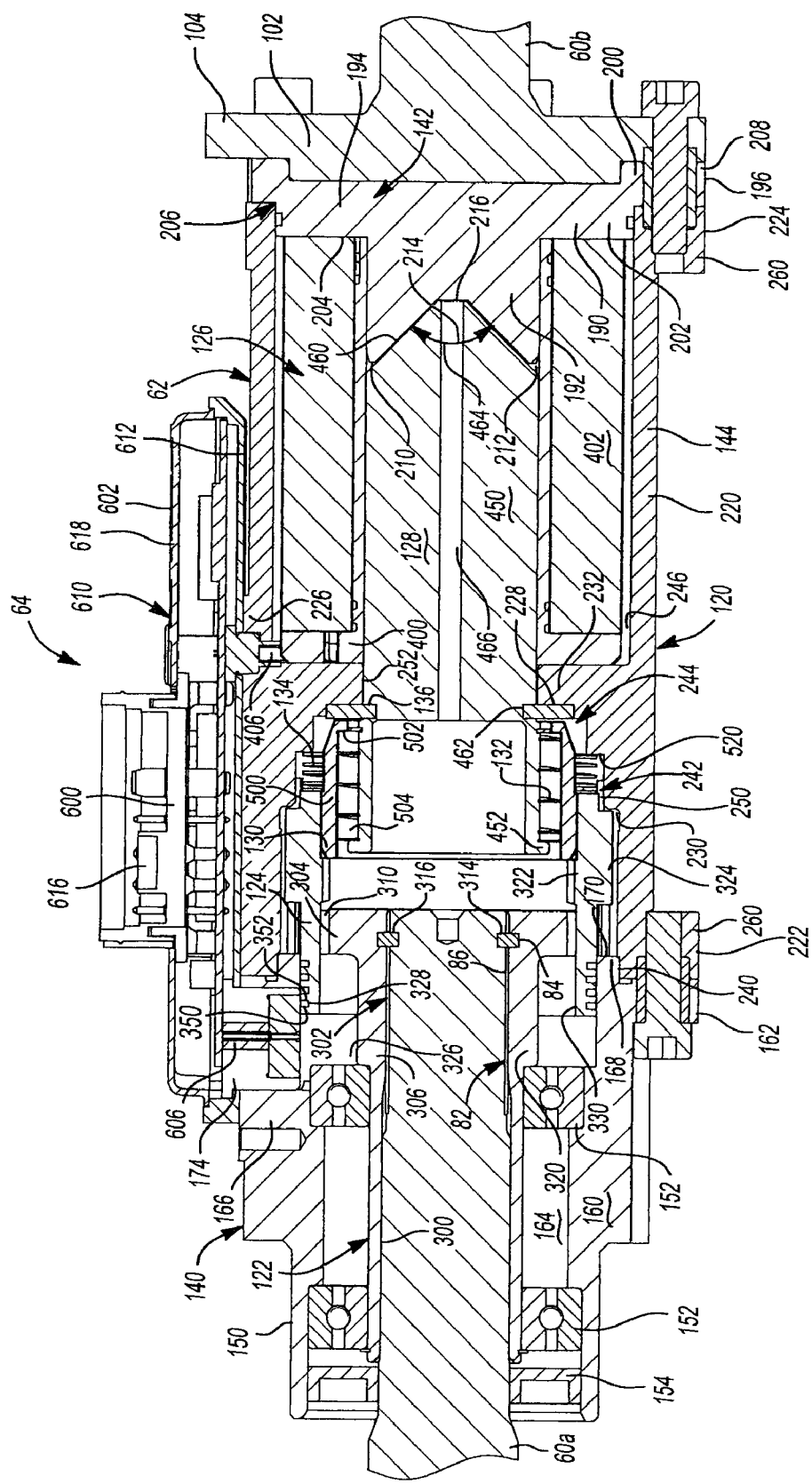
FIG. 4 is a section view similar to that of FIG. 3 but illustrating the second transmission member in the disengaged condition.

The second transmission member 124 can be disposed about the first transmission member 122 and can be received in the bores 164 and 228 such that the sensor target 328 is disposed in-line with the sensor aperture 174. The second transmission member 124 can be axially movable relative to the first transmission member 122 between a first or engaged position in which the fourth coupling member 322 is non-rotatably coupled to the third coupling member 304 as shown in FIG. 3, and a second or disengaged position in which the fourth coupling member 322 is decoupled from the third coupling member 304 to permit relative rotation between the first and second transmission members 122 and 124 as shown in FIG. 4. Those of ordinary skill in the art will appreciate that positioning of the second transmission member 124 in the first position can non-rotatably couple the first stabilizer bar member 60a to the housing 144 (and thereby to the second stabilizer bar member 60b), while positioning of the second transmission member 124 in the second position can decouple the first stabilizer bar member 60a from the housing 144 to thereby permit relative rotation between the first and second stabilizer bar members 60a and 60b.

The coil assembly 126 can be disposed in the third portion 246 of the bore 228 in the housing 144 and can include an annular bobbin 400 and a coil of wire 402 that is wound around about the bobbin 400. The coil of wire 402 can include a pair of terminals 406 that are electrically coupled to the controller assembly 64. A first side of the coil assembly 126 can abut the interior wall 232 in the housing 144 and a second, opposite side of the coil assembly 126 can abut the end face 204 of the cap member 190. The portion of the coil assembly 126 adjacent the second end can be disposed about the plunger backstop 192.

The plunger 128 can be a generally cylindrical shaft-like structure having a body portion 450 and a flange portion 452. The body portion 450 can have a tip 460 and a ring groove 462. The tip 460 can be configured in a manner that is complementary to the configuration of the plunger aperture 212 in the plunger backstop 192. In the example provided, the tip can has a frusto-conical shape with a cone angle 464 of about 60° to about 120°. It will be appreciated that the cone angle 464 and the cone angle 214 can be about equal. The ring groove 462 can be formed about the body portion 450 and can be sized to receive the retaining ring 136. A through-hole 466 can be formed through the body portion 450 and can be shaped and sized in any appropriate manner. For example, the size and shape of the through-hole 466 can be selected to reduce or eliminate the build-up of pressure that might otherwise occur when the plunger 128 is translated and/or to reduce the overall mass of the plunger 128. The body portion 450 can be received into the bore 228 of the housing 144 and can extend through the aperture 252 in the interior wall 232. The flange portion 452 can be coupled to an end of the body portion 450 opposite the tip 460.

The sleeve 130 can be an annular structure having a body 500 and a flange member 502. The body 500 can be fixedly coupled (e.g., press fit, welded) to the second transmission member 124 and can define an aperture 504 into which the end of the plunger 128 opposite the tip 460 is disposed. Although the sleeve 130 and the second transmission member 124 are illustrated and described herein as being discrete components, it will be appreciated that these components could be unitarily formed. The flange member 502 can be coupled to an end of the body 500 opposite the second transmission member 124.

The first spring 132 can be configured to bias the plunger 128 in a direction opposite the plunger backstop 192. In the example provided, the first spring 132 is a compression spring that is fitted about the body portion 450 of the plunger 128 between the flange portion 452 and the flange member 502 of the sleeve 130. Those of ordinary skill in the art will appreciate from this disclosure that the first spring 132 and the sleeve 130 can cooperate to couple the plunger 128 to the second transmission member 124.

The second spring 134 can be configured to bias the second transmission member 124 toward the engaged position (FIG. 3). In the particular example provided, the second spring 134 is a compression spring that is fitted about the sleeve 130 between a shoulder 520 in the housing 144 and an axial end face of the second transmission member 124.

The retaining ring 136 can be disposed in the retaining ring groove 462 in the body portion 450 of the plunger 128 to limit the distance by which the flange member 502 of the sleeve 130 can be spaced apart from the flange portion 452 of the plunger 128.

The controller assembly 64 can include a controller 600 and a controller housing 602. The controller 600 can include hardware for controlling the operation of the clutch assembly 62 and a sensor suite 606 having one or more sensors that sense various parameters or conditions of the clutch assembly 62, the vehicle V (FIG. 1) and/or the environment. In the example provided, the sensor suite 606 includes a single back-biased Hall-effect sensor that is configured to sense the sensor target 328, such as an AT635LSETN-T sensor marketed by Allegro MicroSystems of Worcester Mass., but those of ordinary skill in the art will appreciate that the number and type of sensors that are employed may be selected in accordance with a desired level (i.e., quantity and quality) of information relating to the operation of the anti-roll system 50. For example, additional sensors may be employed to identify a direction of travel of the second transmission member 124 or whether the plunger 128 and/or the second transmission member 124 has moved sufficiently to permit the controller assembly 64 to reduce the power that is transmitted to the coil assembly 126. In this regard, it will be appreciated that the controller assembly 64 can operate the coil assembly 126 in a first mode to initiate movement of the second transmission member 124, and a second mode to maintain the second transmission member 124 in a desired position. For example, the controller assembly 64 can provide DC electrical power of a predetermined voltage to the coil assembly 126 to operate it in the first mode, and can provide DC electrical power in a pulse-width-modulated (PWM) form to the coil assembly 126 to operate it in the second mode. The supply of electrical power to the coil assembly 126 in a PWM form is desirable as it reduces overall energy consumption and generates relatively lower amounts of heat as compared to straight DC electrical power. It will be appreciated that electrical power may be transmitted to the coil assembly 126 in a PWM form during the first mode and that the duty cycle employed for the first and second modes can be different.

The controller housing 602 can be a metallic or plastic enclosure that is configured to sealingly enclose the controller 600 therein. In the particular example provided, the controller housing 602 is a box-like structure having a plurality of mounting bosses 610 that are employed to fixedly but removably couple the controller housing 602 to the mounting pads 226 of the housing 144 via threaded fasteners (not shown). The sensor suite 606 can extend from a lower wall 612 of the controller housing 602 and can be received into the sensor aperture 174 in the sensor boss 166. One or more resilient seal members (not specifically shown) can be employed to form a seal between the controller 600 and the housing assembly 120 to thereby inhibit the ingress of dirt, debris and moisture into the controller 600 and/or the housing assembly 120. A connector 616, which can be coupled to the controller 600, can extend through an upper wall 618 of the controller housing 602. The connector 616 can facilitate the electrical coupling of the controller 600 to a power source (not shown) and to a vehicle controller/car area network (CAN) (not shown) to permit electrical power and appropriate data to be transmitted to the controller 600 and/or from the controller 600 to the CAN. The controller 600 can be electrically coupled to the terminals 406 of the coil of wire 402.

In operation, the second spring 134 biases the second transmission member 124 toward the first position so that the third and fourth coupling members 304 and 322 are engaged to one another to thereby couple the first and second stabilizer bar members 60a and 60b with one another. As those of ordinary skill in the art will appreciate, movement of the first and second stabilizer bar members 60a and 60b relative to one another will transmit torque through the clutch assembly 62. Torque can be transmitted concentrically through the clutch assembly 62 (i.e., evenly about the axis along which the second transmission member 124 slides, which in the example provided is the longitudinal axis of the bore 228 in the housing 144) so that the various translating components, such as the second transmission member 124, are not subjected to side-loads.

When de-coupling of the first and second stabilizer bar members 60a and 60b is desired, the controller assembly 64 can energize the coil assembly 126 to cause the plunger 128 to move toward the plunger backstop 192 and compress the first spring 132. In situations where relatively little or no torque is being transmitted through the clutch assembly 62, the force exerted by the (compressed) first spring 132 onto the sleeve 130 can cause the sleeve 130 to translate in a direction toward the interior wall 232 of the housing 144. As the sleeve 130 and the second transmission member 124 are coupled to one another, translation of the sleeve 130 will effect a corresponding translation of the second transmission member 124 that positions the second transmission member 124 into the second position wherein the third and fourth coupling members 304 and 322 are decoupled from one another to thereby decouple the first and second stabilizer bar members 60a and 60b from one another. It will be appreciated from this disclosure that the positioning of the second transmission member 124 in the second or disengaged position (FIG. 4) can compress the second spring 134 between the second transmission member 124 and the housing 144. It will be appreciated that the clutch assembly 62 (FIG. 2) can be configured so as to couple the first and second stabilizer bar members 60a and 60b with one another in the event that the clutch assembly 62 (FIG. 2) experiences a loss of electrical power.

Those of ordinary skill in the art will appreciate from this disclosure that the fourth coupling member 322 may resist sliding relative to the third coupling member 304 in situations where a relatively high level of torque is being transmitted through the clutch assembly 62 (this phenomenon is hereinafter referred to as "torque lock"). Accordingly, when the plunger 128 is shifted toward the plunger backstop 192 in such situations, the first spring 132 will be compressed between the flange portion 452 of the plunger 128 and the flange member 452 of the sleeve 130. When the torque that is transmitted through the clutch assembly 62 reduces sufficiently, the force exerted by the (compressed) first spring 132 will urge the sleeve 130 toward the interior wall 232 to thereby move the second transmission member 124 into the second or disengaged position (FIG. 4).

The sensor suite 606 can be employed to monitor a position of the sensor target 328 and can generate a signal to indicate that the sensor target 328 has moved by a distance that correlates to the disengagement of the third and fourth coupling members 304 and 322. It will be appreciated that electrical energy may be provided by the controller 600 using a pulse-width-modulation technique. The controller 600 can employ a first, relative high energy duty cycle so that the apparent voltage provided to the coil assembly 126 is relatively high to initiate movement of the plunger 128 to uncouple the first and second stabilizer bar members 60a and 60b from one another. In response to a signal from the sensor suite 606 that indicates that the second transmission member 124 has moved sufficiently to de-couple the third and fourth coupling members 304 and 322, the controller 600 can employ a second, relatively lower energy duty cycle to maintain the second transmission member 124 in the second or disengaged position. In this regard, a relatively lower duty cycle can be employed to hold or maintain the plunger 128 in the second position. The lower energy duty cycle can provide a relatively lower apparent voltage and can reduce energy consumption and the generation of heat by the coil assembly 126.

To re-engage the first and second stabilizer bar members 60a and 60b to one another (e.g., the spline 310a is not aligned to an associated space between a pair of the splines 340), the controller assembly 64 can terminate the supply of electrical power to the coil assembly 126, which can permit the second spring 134 to urge the second transmission member 124 into the first position so that the third and fourth coupling members 304 and 322 are coupled to one another. In situations where the third and fourth coupling members 304 and 322 are not aligned to one another, the force exerted by the compressed second spring 134 will cause the second transmission member 124 to translate when the third and fourth coupling members 304 and 322 are aligned to one another.

Figure 5:
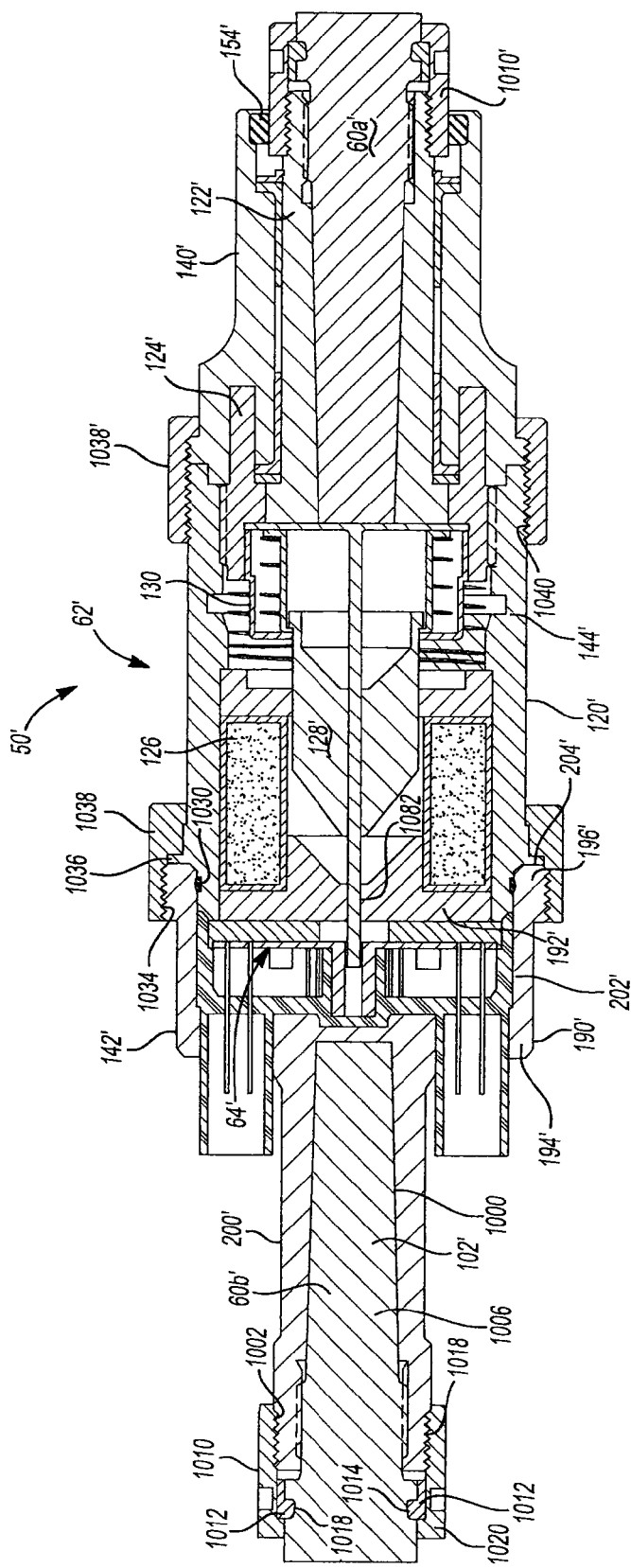
FIG. 5 is a longitudinal section view similar to that of FIG. 3 but illustrating another anti-roll system constructed in accordance with the teachings of the present disclosure.
Figure 6:
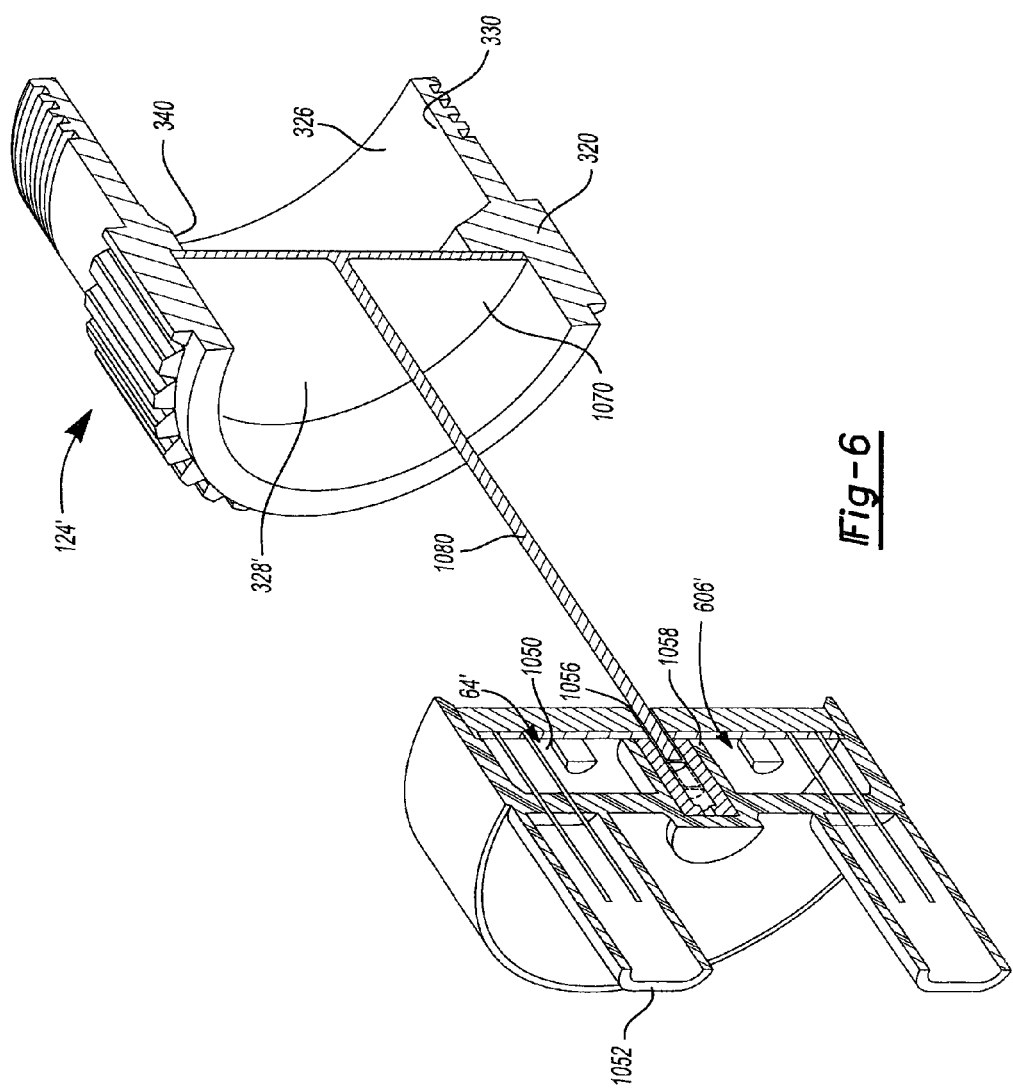
FIG. 6 is a perspective view of a portion of the anti-roll system of FIG. 5 in partial section illustrating the second transmission member and the controller assembly in greater detail.

While the anti-roll system 50 has been described thus far as including a controller assembly 64 that is mounted to an exterior surface of a clutch assembly 62, those of ordinary skill in the art will appreciate that the invention, in its broader aspects, may be constructed somewhat differently. For example, the controller assembly can be housed in the second end cap as shown in FIGS. 5 and 6. In this arrangement, the anti-roll system 50' can include a clutch assembly 62' and a controller assembly 64'. Except as otherwise described below, the clutch assembly 62' and the controller assembly 64' can be generally similar or identical to the clutch assembly 62 and controller assembly 64 of FIG. 1.

The clutch assembly 62' can include a housing assembly 120' and a second transmission member 124'. The housing assembly 120' can include a first end cap 140', a second end cap 142' and a housing 144'. The first end cap 140' and the housing 144 can be generally similar to the first end cap 142 and the housing 144 of FIG. 2 except that the first end cap 140' need not include a sensor aperture 150 (FIG. 2) and the housing 144' need not include the mounting pads 226 (FIG. 2). The second end cap 142' can include a cap member 190' and a plunger backstop 192'. The cap member 190' can include a body 194' and a flange 196'. The body 194' can define a coupling portion 200' and a pilot portion 202'.

The coupling portion 200' can be configured to engage the coupling member 102' of the second stabilizer bar member 60b' such that the second stabilizer bar member 60b' and the cap member 190' are non-rotatably coupled to one another. In the particular example provided, the coupling portion 200' includes an internal tapered bore 1000 and a threaded coupling segment 1002, while the second stabilizer bar member 60b' includes a tapered stem 1006 and a circumferentially-extending locking groove 1008. A fastener 1010 and a pair of keepers or shell members 1012 can be employed to fixedly couple the tapered stem 1006 to the coupling portion 200'. The shell members 1012 can have a circumferentially extending rib 1014 that can be received into the locking groove 1008. The fastener 1010 can have a threaded portion 1018, which can threadably engage the threaded coupling segment 1002, and a shoulder 1020 that can abut the shell members 1012. Accordingly, the fastener 1010 can be tightened to the threaded coupling segment 1002 such that the shoulder 1020 of the fastener 1010 will drive the shell members 1012 (and thereby the tapered stem 1006) toward the housing 144' and thereby engage the surface of the tapered stem 1006 to the surface of the internal tapered bore 1000. It will be appreciated that the tapers of the stem 1006 and the bore 1000 can conform to be a standard taper configuration, such as a #2 or #3 Morse taper, and that mating engagement of these surface can transmit torque. It will be further appreciated that the first stabilizer bar member 60a' and the first transmission member 122' can be configured in a similar manner. In the particular example provided, the seal 154' that is carried by the first end cap 140' sealingly engages the fastener 1010' to inhibit the ingress of debris and moisture to the interior of the first end cap 140. It will be appreciated that the seal 154' could seal against the first stabilizer bar member 60a' or the first transmission member 122' in the alternative.

The pilot portion 202' can be a generally cylindrical structure and can receive the controller assembly 64' and the housing 144' therein. A seal member 1030 can be disposed between the outer diameter of the housing 144' and the inner diameter of the pilot portion 202'.

The flange 196' can include an end face 204' and a threaded coupling portion 1034. The end face 204' can be abutted against a circumferentially extending flange 1036 that is formed on the housing 144'. A fastener 1038 can be disposed over the housing 144' and can threadably engage the threaded coupling portion 1034 to permit the flange 196' to be drawn toward the housing 144' such that the end face 204' abuts the circumferentially extending flange 1036. It will be appreciated that the opposite end of the housing 144' and first end cap 140' can be constructed in a similar manner. In the particular example provided, the fastener 1038' is disposed over the first end cap 140' and threadably engaged to threads 1040 that are formed on the housing 144'.

The controller assembly 64' can be a module that can be received into the pilot portion 202' of the second end cap 142'. The controller assembly 64' can be fixedly coupled and sealingly engaged to the second end cap 142'. The controller assembly 64' can include a circuit board 1050 having and one or more connector ports 1052. The circuit board 1050 can include a sensor aperture 1056 and a sensor suite 606' having one or more sensors 1058, such as a Hall-effect sensor or an optical sensor, such as an LED emitter/detector). The connector ports 1052 can be coupled to the circuit board 1050 and can extend through the second end cap 142'. The connector ports 1052 facilitate the coupling of one or more wire harnesses (not shown) to the controller assembly 64' to facilitate the transmission of electrical power to the anti-roll system 50' as well as to facilitate the transmission of data to and from the controller assembly 64'.

The second transmission member 124' can be constructed generally similar to the second transmission member 124 (FIG. 2) except that a sensor target 338' can be coupled to the body 320 of the second transmission member 124'. The sensor target 338' can include body portion 1070 and a target member 1080. The body portion 1070 can be received in the bore 326 on a side of the teeth or splines 340 opposite the pilot portion 330 of the bore 326. In the particular example provided, the body portion 1070 is a round plinth that is press-fit into the bore 326 and abutted against the teeth 340, but those of ordinary skill in the art will appreciate that other shapes and/or attachment methods can be employed. For example, the body portion 1070 can be retained against the splines 340 by the sleeve 130. The target member 1080 can be coupled to the body portion 1070 and can extend toward the controller assembly 64'. In the particular example provided, the target member 1080 is a rod that extends through the through-hole 466 in the plunger 128', a through hole 1082 in the plunger backstop 192' and the sensor aperture 1056 in the circuit board 1050.

When the anti-roll system 50' is operated so that the first and second stabilizer bar members 60a' and 60b' are engaged to one another, the second transmission member 124' can be positioned relatively closer to the first stabilizer bar member 60a' so that the target member 1080 can be disposed in a first position (shown in solid line) in which the target member 1080 can be spaced apart from the sensor 1058. Accordingly, the sensor 1058 can produce a first sensor signal that is indicative of the operation of the anti-roll system in an engaged mode.

When the anti-roll system 50' is operated so that the first and second stabilizer bar members 60a' and 60b' are disengaged from one another, the second transmission member 124' can be positioned relatively farther from the first stabilizer bar member 60a' so that the target member 1080 can be disposed in a second position (shown in phantom) in which the target member 1080 can be disposed in-line with the sensor 1058. Accordingly, the sensor 1058 can produce a second sensor signal that is indicative of the operation of the anti-roll system in a disengaged mode.

Figure 7:
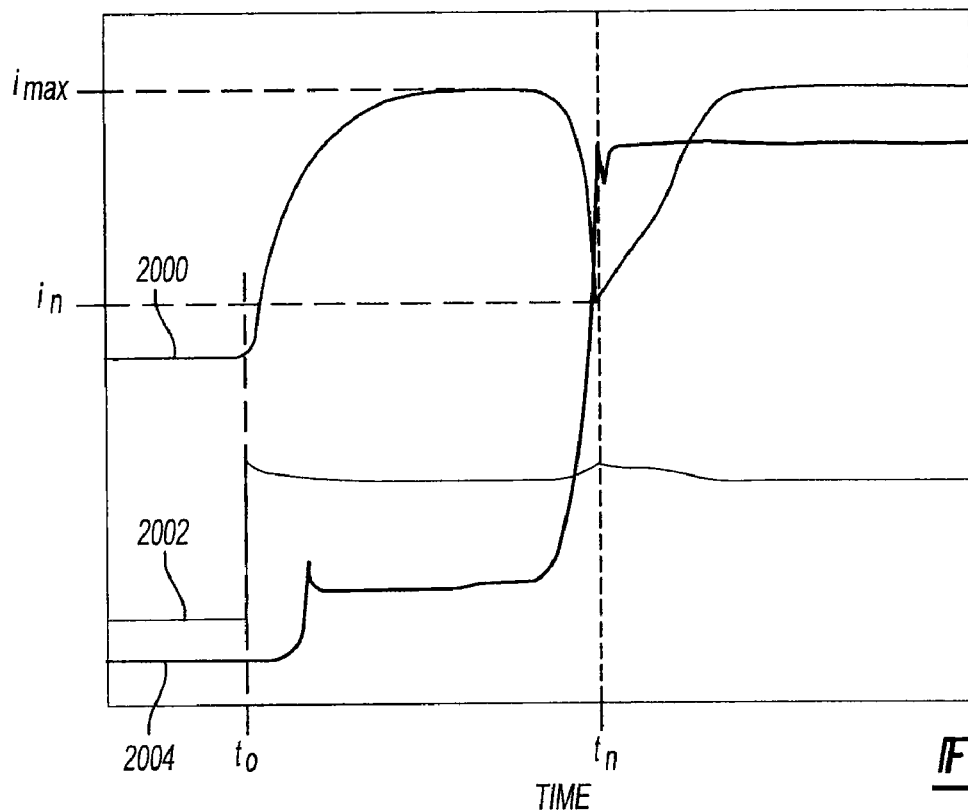
FIG. 7 is a plot of the electrical voltage and electrical current applied to the coil assembly of the anti-roll system of FIG. 5 and the displacement of the plunger of the anti-roll system of FIG. 5 as a function of time.

With reference to FIG. 7, a plots illustrating the application of electrical current and voltage to the coil assembly as a function of time are shown, as is a plot showing the location of the plunger 128' (FIG. 5) as a function of time. In the example provided, the plots of the electrical current (applied to the coil assembly 126), the electrical voltage (applied to the coil assembly 126) and the location of the plunger 128' are indicated by reference numerals 2000, 2002 and 2004, respectively, and electrical power is applied to the coil assembly 126 at time $t_0$. With specific reference to the plot 2000 of the electrical current and the plot 2004 of the location of the plunger 128' (FIG. 5), current flowing through the coil assembly 126 (FIG. 5) rises after time $t_0$ to a maximum current $i_{max}$ to initiate movement of the plunger 128' (FIG. 5). Current flowing through the coil assembly 126 (FIG. 5) drops from $i_{max}$ to $i_n$ at $t_n$ when the plunger 128' (FIG. 5) has accelerated to maximum velocity. When the plunger 128' (FIG. 5) has traveled through its stroke, the current increases from $i_n$ to $i_{max}$.

In view of the above, the controller assembly 64' (FIG. 5) can monitor the magnitude of the electrical current that is supplied to the coil assembly 126 (FIG. 5) for one or more purposes. The controller assembly 64' (FIG. 5) can employ such data to determine that the plunger 128' (FIG. 5) has moved, for example through the identification of changes in the slope of the plot of electrical current wherein the slope is first zero or positive, then negative and then positive. It will be appreciated that the calculation of the slope of a line is within the capabilities of one of ordinary skill in the art and as such, a discussion of the mathematics associated with this task need not be provided herein.

With additional reference to FIG. 5, the ability to determine that the plunger 128' has moved can permit the controller assembly 64' to apply a different amount of electrical power to the coil assembly 126. In this regard, a first amount of electrical power can be input to the coil assembly 126 to move the plunger 128' and thereafter a second, lower amount of electrical power can be input to the coil assembly 126 to maintain the plunger 128' in its translated position. In the example provided, electrical power is supplied to the coil assembly 126 using a pulse-width-modulation technique and the amount of power that is transmitted to the coil assembly 126 is related to the duty cycle. Accordingly, it will be appreciated that a first duty cycle may be employed to move the plunger 128' and a second, lower duty cycle may be employed to maintain the plunger 128' in the translated position. Pulse-width-modulation techniques are well known to those of ordinary skill in the art and as such, further discussion is not required herein.

Moreover, the ability to monitor the slope of the plot 2000 of electrical current can provide diagnostic capabilities to the controller assembly 64'. For example, the position of the plunger 128' can be identified by transmitting electrical power to the coil assembly 126 that is sufficient to move the plunger 128' to its translated position. If a negative gradient or slope is detected in the plot 2000 of electrical current, it can be assumed that the plunger 128' was in its returned position (opposite the translated position). If on the other hand a negative slope is not detected in the plot 2000 of electrical current, it can be assumed that the plunger 128' was in its translated position.

In situations where a negative slope is not detected in the plot 2000 of electrical current but the sensor 1058 is producing the second sensor signal, which is indicative of the operation of the anti-roll system in a disengaged mode, the controller assembly 64' can determine that the plunger 128' is checked and can generate an appropriate fault message. In situations where a negative slope is not detected in the plot 2000 of electrical current but the sensor 1058 is producing the first sensor signal, which is indicative of the operation of the anti-roll system in an engaged mode, the controller assembly 64' can determine that the plunger 128' is checked and can generate an appropriate fault message. In situations where a negative slope is detected in the plot 2000 of electrical current but the sensor 1058 is producing the first sensor signal, the controller assembly 64' can determine that the second transmission member 124' is not able to move (e.g., torque locked). In situations where a negative slope is detected in the plot 2000 of electrical current but the sensor 1058 is producing the second sensor signal throughout this time, the controller assembly 64' can determine that the sensor 1058 is not operating properly and can generate an appropriate fault message.

In situations where the first and second stabilizer bar members 62a' and 62b' are disengaged from one another and the coil assembly 126 is being supplied with the second amount of electrical power to maintain the plunger 128' in its translated position, the controller assembly 64' can perform a diagnostic check wherein the first amount of electrical power is supplied to the coil assembly 126 and the slope of the plot 2000 of electrical current is monitored. If a negative slope is detected in the plot 2000 of electrical current during this diagnostic check, the amount of power that is supplied to the coil assembly 126 was insufficient to maintain the plunger 128' in its translated position. The controller assembly 64' may generate an appropriate fault message and/or can change the parameters that control the amount of power that is supplied to the coil assembly 126 to maintain the plunger 128' in its translated position. For example, the controller assembly 64' could employ a look-up table to select a new set of parameters for the second duty cycle.

Figure 8:
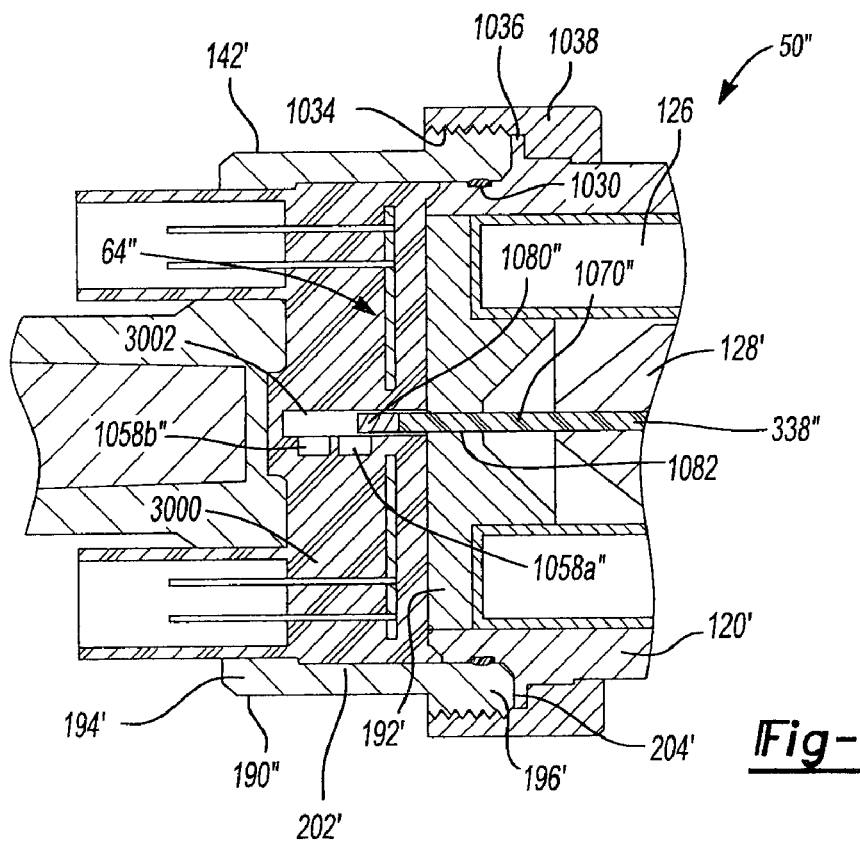
FIG. 8 is a longitudinal section view of a portion of an anti-roll system similar to that of FIG. 5 but illustrating a controller that is encapsulated in an end cap of the clutch assembly.

With reference to FIG. 8, an anti-roll system 50" is illustrated to be similar to the anti-roll system 50' of FIG. 5, except that the controller assembly 64" can be a sealed unit that can be coupled to or disposed adjacent the cap member 190". In the particular example provided, the controller 64" is encapsulated in a plastic material that forms a controller housing 3000. The controller housing can define a sensor aperture 3002 into which the sensor target 338" can be received. In the particular example provided, the sensor target 338" includes a non-magnetic body portion 1070" and a magnetic target member 1080", and a pair of sensors 1058a" and 1058b" are employed to sense a location of the target member 1080" within the sensor aperture 3002. The sensor 1058a" can be configured to generate a first sensor signal when the target member 1080" is disposed proximate thereto (to permit the controller 64" to determine that the second transmission member 124' (FIG. 5) is in the first position). The sensor 1058b" can be configured to generate a second sensor signal when the target member 1080" is disposed proximate thereto (to permit the controller 64" to determine that the second transmission member 124' (FIG. 5) is in the second position). It will be appreciated that the controller 64" could include a third sensor between the sensors 1058a" and 1058b" to identify situations in which the second transmission member 124'

(FIG. 5) is positioned between the first and second positions. It will also be appreciated that the packaging of the controller (e.g., controller 64") in the cap member (e.g., cap member 190") as shown in FIGS. 5 and 8 is advantageous in that it helps protect the controller from damage caused by impacts (e.g., rocks) and can help to shield the controller from electromagnetic interference (EMI).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A stabilizer bar system comprising:
    a first stabilizer bar member;
    a second stabilizer bar member; and
    a clutch having a housing, a first coupling member, a second coupling member, and an actuator, the housing defining a bore into which the first stabilizer bar member is received, the second stabilizer bar member being non-rotatably coupled to the housing, the first coupling member being received in the bore and rotatable about an axis, the first coupling member being non-rotatably coupled to the first stabilizer bar member, the second coupling member being an annular structure that is axially movable along the rotational axis of the first coupling member between a first position, in which the second coupling member non-rotatably couples the first coupling member to the housing, and a second position that permits rotation of the first coupling member relative to the housing, the actuator being configured to move the second coupling member between the first and second positions, the actuator comprising a plunger that is axially movable along the rotational axis, the second coupling member being disposed concentrically about the plunger and the plunger extending at least partially through the second coupling member.

2. The stabilizer bar system of claim 1, wherein the first stabilizer bar member is generally L-shaped.

3. The stabilizer bar system of claim 1, wherein a through-hole is formed through the plunger.

4. The stabilizer bar system of claim 1, wherein the clutch further includes a return spring for biasing the second coupling member towards the first position.

5. The stabilizer bar system of claim 4, wherein the clutch further includes another spring that is disposed between the plunger and the second coupling member to bias the plunger relative to the second coupling member toward the first stabilizer bar.

6. The stabilizer bar system of claim 1, further comprising a controller assembly having a controller with a sensor, the sensor being configured to sense a position of an element of the clutch that translates along the longitudinal axis.

7. The stabilizer bar system of claim 6, wherein the element of the clutch is the plunger.

8. The stabilizer bar system of claim 7, wherein the plunger includes a sensor target and wherein the sensor is a Hall-effect sensor.

9. The stabilizer bar system of claim 6, wherein the controller assembly is coupled to the housing.

10. The stabilizer bar system of claim 1, wherein fasteners are employed to fixedly couple the second stabilizer bar to the housing.

11. The stabilizer bar system of claim 1, wherein the actuator further comprises a coil that is mounted concentrically about the rotational axis, the coil being configured to selectively generate a magnetic field.

12. The stabilizer bar system of claim 1, wherein the first coupling member and the first stabilizer bar member are non-rotatably coupled in a lash-less manner.

13. The stabilizer bar system of claim 12, wherein the first coupling member and the first stabilizer bar member include mating spline teeth.

14. The stabilizer bar system of claim 13, wherein one of the first coupling member and the first stabilizer bar member includes a tapered shaft and the other one of the first coupling member and the first stabilizer bar member includes a tapered bore that is complementary to the tapered shaft.

15. A stabilizer bar system comprising:
    a first stabilizer bar member;
    a second stabilizer bar member; and
    a clutch having a housing, a first coupling member, a second coupling member, and an actuator, the housing defining a bore into which the first stabilizer bar member is received, the second stabilizer bar member being non-rotatably coupled to the housing, the first coupling member being received in the bore and rotatable about an axis, the first coupling member being non-rotatably coupled to the first stabilizer bar member, the second coupling member being an annular structure that is axially movable along the rotational axis of the first coupling member between a first position, in which the second coupling member non-rotatably couples the first coupling member to the housing, and a second position that permits rotation of the first coupling member relative to the housing, the actuator being configured to move the second coupling member between the first and second positions, the actuator comprising a plunger, an annular coil, a first spring and a second spring, the plunger being axially movable along the rotational axis, the coil being disposed concentrically about the plunger, the first spring biasing the second coupling member toward the first position, the second spring permitting relative axial movement of the plunger relative to the second coupling member such that the plunger can be moved by a magnetic field created by the coil when the first and second coupling members are torque-locked.

16. The stabilizer bar system of claim 15, wherein a through-hole is formed through the plunger.

17. The stabilizer bar system of claim 15, further comprising a controller assembly having a controller with a sensor, the sensor being configured to sense a position of an element of the clutch that translates along the longitudinal axis.

18. The stabilizer bar system of claim 17, wherein the element of the clutch is the plunger.

19. The stabilizer bar system of claim 17, wherein the controller assembly is coupled to the housing.

20. A stabilizer bar system comprising:

a first stabilizer bar member;

a second stabilizer bar member; and a clutch having a housing, a first coupling member, a second coupling member, and an actuator, the housing defining a bore into which the first stabilizer bar member is received, the second stabilizer bar member being non-rotatably coupled to the housing, the first coupling member being received in the bore and rotatable about an axis, the first coupling member being non-rotatably coupled to the first stabilizer bar member, the second coupling member being an annular structure that is axially movable along the rotational axis of the first coupling member between a first position, in which the second coupling member non-rotatably couples the first coupling member to the housing, and a second position that permits rotation of the first coupling member relative to the housing, the actuator being configured to move the second coupling member between the first and second positions, the actuator comprising a plunger that is axially movable along the rotational axis, the second coupling member being disposed concentrically about the plunger and the plunger extending at least partially through the second coupling member;

wherein the first stabilizer bar member is generally L-shaped, wherein a through-hole is formed through the plunger, and wherein the clutch further includes a first spring, a second spring and a controller assembly, the first spring being configured to bias the second coupling member towards the first position, the second spring being disposed between the plunger and the second coupling member to bias the plunger relative to the second coupling member toward the first stabilizer bar, the controller assembly that is mounted to the housing, the controller assembly having a controller with a sensor, the sensor being configured to sense a position of an element of the clutch that translates along the longitudinal axis.

* * * * *